No. 645,483. Patented Mar. 13, 1900.
J. MONKHOUSE.
FRICTION CLUTCH.
(Application filed Oct. 27, 1898.)
(No Model.)
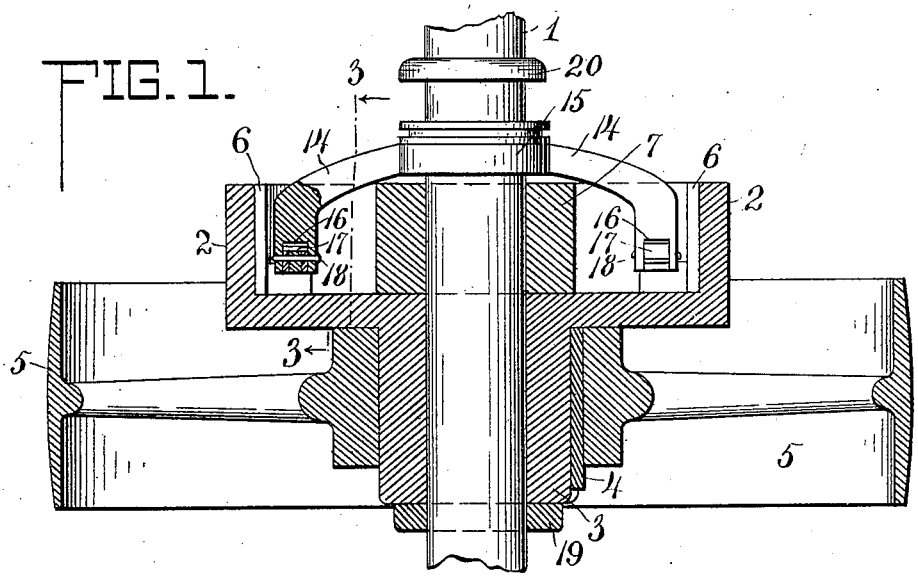
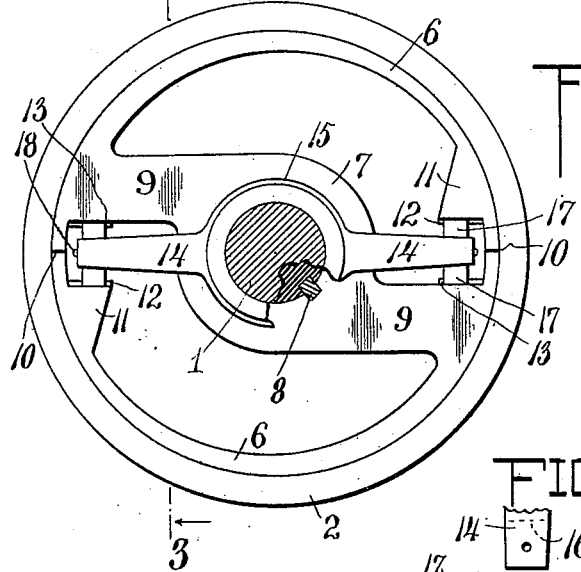
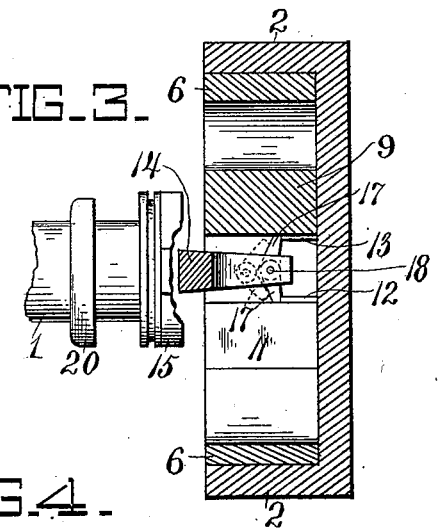
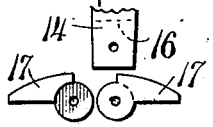
Witnesses.
H. E. Allen
Edward K. Allen
Inventor.
James Monkhouse.
By Knight Bros.
Attys.

UNITED STATES PATENT OFFICE.

JAMES MONKHOUSE, OF HONOLULU, HAWAII.

FRICTION-CLUTCH.

SPECIFICATION forming part of Letters Patent No. 645,483, dated March 13, 1900.

Application filed October 27, 1898. Serial No. 694,712. (No model.)

*To all whom it may concern:*

Be it known that I, JAMES MONKHOUSE, a subject of the Queen of Great Britain and Ireland, and a resident of Honolulu, Hawaii, have invented certain new and useful Improvements in Friction-Clutches, of which the following is a specification.

My invention relates to an improved means for quickly and easily establishing and breaking driving connection between two parts, such as a shaft and pulley, the object of my invention being to provide simple, effective, and durable means for accomplishing the desired results.

My invention comprises two concentrically-arranged members, one of which has its periphery split preferably at two points to adapt it to be forced into frictional contact with the other member, and a movable yoke having its ends extending to the peripheral splits of the expansible member and there provided with knuckle-jointed toggle-dogs which slide upon the opposed portions of the split member into engagement with ledges thereon and expand the split member into contact with the other member of the clutch. The expansible or split member has the respective halves of its periphery formed integral with diametrically-opposed radial spokes, so that the expansive force is exerted in each case between a spoke and a flexible semicircle of the rim, and circumferential strain as distinguished from the outward expansion of the rim is offset by the two expansion-toggles.

My invention will be fully understood upon reference to the accompanying drawings, in which—

Figure 1 is an axial section of a friction-clutch constructed in accordance with my invention. Fig. 2 is an edge elevation of the same. Fig. 3 is a section taken on the line 3 3, Figs. 1 and 2. Fig. 4 is a detail view showing the construction of the knuckle-jointed levers.

1 represents a shaft to which or by which motion is to be imparted. 2 is a friction-rim supported loosely upon said shaft by means of its hub 3, but keyed by means of a feather or spline 4 to a pulley 5, which is to impart rotation to or receive rotation from the shaft 1 as the clutch is applied.

6 represents a friction-ring arranged concentrically within the rim 2 and provided with a hub 7, which is keyed to the shaft 1 by means of feather or spline 8 and connected to the friction-ring 6 by means of the spokes 9. Friction-ring 6 is split at two points, (indicated by the numeral 10,) said splits being located upon corresponding sides of the spokes 9, so as to leave each half of the ring thus formed integrally connected through one of said spokes to the keyed hub. The free end of each half of the ring is formed with an abutment 11, opposed to the edge of the spoke 9, and said abutment and spoke are provided with ledges 12 and 13 for a purpose to be described.

14 represents an expanding-yoke which is adapted by its ring 15 to slide longitudinally upon the shaft 1. This yoke carries at its respective ends knuckle-jointed toggle-dogs 17, the construction of which will readily be understood from Fig. 4 and which are pivoted in the ends of the yokes by pins 18. As the yoke is moved toward the friction-clutch the dogs 17 slide in the position shown by dotted lines in Fig. 3 in between the abutment 11 and spoke 9 until their ends rest upon the ledges 12 and 13, after which a continued movement of the yoke tends to straighten the dogs 17 and to force the abutment 11 and spoke 9 apart until the dogs approach the angle or position illustrated in Fig. 3, when the friction-ring 6 will have been expanded into intimate frictional contact with the rim 2, and if rotation is being imparted to either of the parts 1 or 5 it will immediately be transmitted through the clutch to the other of the said parts. On the other hand, if the yoke 14 is moved in the opposite direction upon the shaft 1 expanding pressure upon the knuckle-jointed dogs 17 is withdrawn and said dogs are permitted to fold under contraction of the ring 6 resulting from its resiliency, so that frictional contact between the ring 6 and the rim 2 will be relieved and relative rotation between the parts 1 and 5 may again be established.

I have not described any special mechanism for imparting movement to the yoke 14 longitudinally of the shaft 1, as it is obvious that any form of lever or other means usually employed for moving one friction-disk into contact with another, as in many well-known forms of friction-clutches, may be employed for this purpose.

19 is a collar fixed upon the shaft 1 for the purpose of confining the rim 2 against the hub 7 of the ring 6, and 20 is a collar, likewise fixed upon the shaft, for limiting movement of the yoke 14.

Having thus described my invention, the following is what I claim as new therein and desire to secure by Letters Patent:

1. A friction-clutch comprising two concentrically-arranged members, one of which is split to adapt it to be moved into contact with the other, and is provided upon its opposed faces at the split with ledges, and a controlling member carrying knuckle-jointed dogs sliding upon the opposed faces of the split into engagement with the ledges thereof expanding under continued movement of the controlling member, to force the split member into contact with the concentric member for establishing frictional contact between the two latter.

2. A friction-clutch comprising a rim, a concentrically-arranged friction-ring formed with a hub and spokes and divided into a plurality of peripheral sections, each connected at one end by a spoke with the hub, and provided on its free end with an abutment opposed to a spoke connecting the adjacent section, ledges formed on the opposed faces at each split, the knuckle-jointed toggle-dogs having means for sliding them upon the said opposed faces into engagement with the ledges, and expanding them substantially as and for the purposes set forth.

3. In combination with the expansible split rim of a friction-clutch, the ledges located on the opposed faces of said split, an expanding-yoke movable longitudinally upon the shaft, and sliding toggle-dogs carried by said yoke, which enter between the sections of the rim at the points of separation and expand them as the yoke is forced toward the rim; substantially in the manner and for the purposes set forth.

4. In a friction-clutch, the combination of the rim 2, having hub 3, the ring 6 divided diametrically into two sections, hub 7 connected by spokes 9 with corresponding ends of the respective ring-sections, abutments 11 carried by the free ends of the respective ring-sections and opposed to the spokes 9, ledges 12 and 13 formed respectively upon the abutments 11 and spokes 9, the yoke 14 provided with hub 15 which permits it to slide upon the shaft 1, and knuckle-jointed dogs 17 pivoted in the ends of the yoke 14 and entering between and sliding upon abutments 11 and spokes 9 into engagement with the ledges 12 and 13; all substantially as and for the purposes set forth.

5. In a friction-clutch, the combination of the rim 2, formed with hub 3, the pulley 5 keyed to the hub 3, the friction-ring 6 provided with the hub 7, shaft 1 keyed to said hub 7, expanding-yoke 14 provided with hub 15 sliding upon shaft 1, knuckle-jointed dogs 17 mounted in the respective ends of the yoke 14; said ring 6 being diametrically divided into two peripheral sections whereby it is expansible into frictional contact with the rim 2, and each of said sections being connected at one end by a spoke 9 with the hub 7 and carrying at its other end an abutment 11 opposed to an adjacent spoke, and said knuckle-jointed dogs sliding upon the opposed abutments and spokes, substantially in the manner and for the purposes set forth.

The foregoing specification signed at Honolulu, Hawaiian Islands, this 24th day of September, 1898.

JAMES MONKHOUSE.

In presence of—
T. H. MACDONALD,
JOHN PIGGOTT.